(12) United States Patent
Marche

(10) Patent No.: US 8,789,790 B2
(45) Date of Patent: Jul. 29, 2014

(54) AIRCRAFT ENGINE ATTACHMENT PYLON

(75) Inventor: Hervé Marche, Toulouse (FR)

(73) Assignee: Airbus Operations S.A.S., Toulouse (FR)

( * ) Notice: Subject to any disclaimer, the term of this patent is extended or adjusted under 35 U.S.C. 154(b) by 158 days.

(21) Appl. No.: 13/408,323

(22) Filed: Feb. 29, 2012

(65) Prior Publication Data

US 2012/0234970 A1    Sep. 20, 2012

(30) Foreign Application Priority Data

Mar. 18, 2011    (FR) ...................................... 11 52249

(51) Int. Cl.
*B64D 27/00*    (2006.01)

(52) U.S. Cl.
USPC .......................................................... 244/54

(58) Field of Classification Search
USPC ......... 244/54, 55; 248/200, 554, 557; 60/696, 60/697; 403/205
See application file for complete search history.

(56) References Cited

U.S. PATENT DOCUMENTS

| 6,209,822 B1* | 4/2001 | Le Blaye ......................... 244/54 |
| 2008/0197262 A1* | 8/2008 | Combes ......................... 248/554 |
| 2010/0147997 A1 | 6/2010 | Martinou et al. |

FOREIGN PATENT DOCUMENTS

| EP | 1 896 327 B1 | 1/2009 |
| FR | 2 915 176 | 10/2008 |

OTHER PUBLICATIONS

"2009 MISUMI Metric Catalog." Anonymous. Published in 2009. pp. 2181-2182. Retrieved from <www.misumiusa.com/CategoryImages/Metric_2009_pdf/p2181.pdf>.*
French Preliminary Search Report issued Dec. 9, 2011, in Patent Application No. FR 1152249 (with English Translation of Category of Cited Documents).

* cited by examiner

*Primary Examiner* — Tien Dinh
*Assistant Examiner* — Michael Kreiner
(74) *Attorney, Agent, or Firm* — Oblon, Spivak, McClelland, Maier & Neustadt, L.L.P.

(57) ABSTRACT

An aircraft engine attachment pylon including a box formed by an assembly of a first spar, a second spar, two lateral panels, and an aft engine attachment fitted with an aft attachment body. The engine attachment may be provided with two lateral fittings associated with the two lateral panels to which they are fixed to and project from laterally outside the box, each of the fittings forming a plane attachment interface with the attachment body through which bolts pass. Each attachment interface may be in the shape of a straight segment inclined at 45° from a vertical direction of the pylon.

15 Claims, 4 Drawing Sheets

AIRCRAFT ENGINE ATTACHMENT PYLON

TECHNICAL FIELD

This invention relates in general to an attachment pylon for an aircraft engine such as a turbojet. This type of attachment pylon is also called an EMS (Engine Mounting Structure), and can be used to suspend the turbojet below the aircraft wing, or to mount this turbojet above this wing through a plurality of engine attachments.

STATE OF THE PRIOR ART

Such an attachment pylon is designed to form the attachment interface between an engine such as a turbojet and an aircraft wing. It transmits forces generated by a turbojet associated with an aircraft to the structure of this aircraft, and it also enables routing of fuel, electrical, hydraulic and air systems between the engine and the aircraft.

The pylon comprises a rigid structure, also called the primary structure, frequently of the "box" type, in other words formed from the assembly of upper and lower spars and two lateral panels connected to each other through transverse inner ribs, to transmit forces.

The pylon is also provided with a mounting system inserted between the turbojet and the rigid structure of the pylon, this system globally comprising at least two engine attachments, usually one forward attachment and one aft attachment.

Furthermore, the mounting system comprises a device for resisting thrusts generated by the turbojet. In prior art, this device, may for example be in the form of two lateral connecting rods connected firstly to an aft part of the turbojet fan casing, and secondly to an aft engine attachment fixed to the turbojet casing.

Similarly, the attachment pylon also comprises a second mounting system inserted between the rigid structure of this pylon and the aircraft wing, this second system typically being composed of two or three attachments.

Finally, the pylon is provided with a secondary structure for segregating and holding systems in place, while supporting aerodynamic fairings.

As mentioned above, a conventional attachment pylon according to prior art is fitted with an aft attachment normally fixed to the lower spar of the box. This specific feature requires access to the inside of the box to be able to mount the aft attachment. However, access inside the pylon is often very limited, which inevitably leads to mounting difficulties that tend to increase cost and time.

One alternative solution was disclosed in document EP 1 896 327 B1. It consists of providing two lateral fittings added onto the box, each fixed between the lower spar and the lateral panel of the box from which it projects laterally. The lateral fittings are fixed on the aft engine attachment body by vertical bolts arranged outside the box.

This solution improves access to the bolts thus offering easier assembly, although it could be improved due to the close proximity between the lateral panels of the box and the bolts.

Furthermore, despite the interposition of these fittings between the lower spar and the lateral panels, the lateral dimension remains large and therefore generates non-negligible aerodynamic disturbances of the secondary flow. Furthermore, this assembly requires recesses in the lateral panels to allow the passage of lateral fittings, and a choke at the lower spar. The transverse inner rib located adjacent to these lateral fittings must also have a special complex shape for "sandwich" assembly of the fittings. These shape discontinuities on the above-mentioned elements generate mechanical weaknesses that have to be compensated, usually increasing cost and mass.

Finally, a shear pin system is provided under the lower spar to resist transverse forces. These means are additional to the lateral fittings that resist vertical forces through the bolts passing through them, significantly increasing the complexity of this zone of the attachment pylon.

SUMMARY OF THE INVENTION

Therefore, the purpose of the invention is to propose an aircraft engine attachment pylon that at least partially solves the disadvantages mentioned above relative to embodiments of the prior art.

To achieve this, the object of the invention is an attachment pylon for an aircraft engine, said pylon comprising a rigid box type structure formed by the assembly of a first spar, a second spar at a spacing from the first spar along a vertical direction (Z) of the pylon, two lateral panels and transverse inner ribs connecting said spars and panels, said pylon also comprising an aft engine attachment fitted with an aft attachment body arranged outside said box, facing said second spar, said aft engine attachment also being fitted with two lateral fittings associated with the two corresponding lateral panels to which they are fixed and from which they project laterally outside said box, each lateral fitting forming a plane attachment interface with said attachment body through which bolts pass.

According to the invention, each attachment interface is in the shape of a straight segment inclined at 45° from the vertical direction (Z) as seen in section on a transverse plane of the pylon passing through it, according to which the distance between said attachment interface and said box increases with increasing distance from the first spar towards the second spar.

The main advantage of this solution is that it reduces the lateral dimension of the assembly formed by the box and the lateral fittings, due to the specific inclination of the attachment interfaces at 45°, which is significantly different from the solution according to prior art according to which these interfaces were horizontal.

Furthermore, since the bolts preferably have the same 45° inclination from the vertical, they are easier to access. This means that the ends of the bolts can be moved further from the lateral panels, so that they can be accessed more easily when tightening.

Furthermore, since the lateral dimension is significantly reduced, there is no longer any need to adopt the previously selected mounting system in which lateral fittings were inserted between the lower spar and the lateral panels. The lateral fittings can be fixed on the outside on lateral panels, without generating significant aerodynamic disturbances on the secondary flow. In this preferred case, the assembly then no longer requires recesses in the lateral panels for the passage of lateral fittings, nor a choke at the lower spar, nor any particular complex shape of the inner transverse rib located adjacent to these lateral fittings, which enabled the "sandwich" mounting of the fittings. The result is a simplified design, considerably limiting shape discontinuities on the above-mentioned elements which results in significant cost and mass savings.

Finally, due the inclination of the two attachment interfaces at 45° from the vertical, each half-attachment is capable of not only resisting forces along the vertical direction, but also forces along the transverse direction. The shear pin system used in prior art for resisting transverse forces is therefore no longer required. This results in a saving in mass and simplification of the design of the attachment pylon.

Preferably, each lateral fitting of the aft engine attachment comprises a first attachment plate onto the box, and a second attachment plate onto the attachment body, said second attachment plate having a bearing surface that defines said attachment interface.

Preferably, said first and second attachment plates are connected by stiffener ribs. In such a case, it would be preferable to arrange the stiffener ribs to be oriented along parallel planes defined by the transverse direction and the vertical direction of the pylon.

Preferably, said first attachment plate bears exclusively on an outer surface of its associated lateral panel. Thus, the bearing of each fitting on the box is preferably made only by this first attachment plate, on its associated lateral panel.

Preferably, the part of the lateral panel on which said first attachment plate bears, has an inner surface that bears on a plane surface defined jointly by the edge of one of the inner transverse ribs and by a lateral flange of the second spar. Therefore the number of shape discontinuities on the elements forming the box is extremely limited.

In this respect, said second spar preferably has an approximately constant width, in other words there is no choke of the type used in prior art.

Preferably, each of said two lateral fittings of the aft attachment is made in a single piece.

Preferably, each of said two lateral fittings of the aft attachment is made from titanium.

Preferably, each plane attachment interface is parallel to the longitudinal direction of the pylon or is possibly inclined relative to the longitudinal direction.

Preferably, said aft engine attachment is designed so as to define two half-attachments each capable of resisting forces applied along the vertical direction (Z) and along the transverse direction (Y) of said pylon.

As mentioned above, this concentrates the resistance of transverse and vertical forces at the two vertical fittings.

However, it is possible to design the layout such that the aft engine attachment also comprises a shear pin capable of resisting forces applied along the transverse direction of the pylon, only in the case of a failure of the means mentioned above provided to resist these vertical forces under fail safe conditions. In this solution, which is identical or similar to that disclosed in document EP 1 896 327 B1, the shear pin passes through the second spar and it has one end housed in the aft attachment body, this end being fitted with a reaming through which a pin also passes through the aft attachment body. Consequently, it should be understood that this shear pin can perform a Fail Safe function to transmit forces applied along the transverse direction, which means that the pin is preferably mounted with clearance in a housing of the aft attachment body. Furthermore, the pin cooperating with the reaming can perform a second Fail Safe function for the transmission of forces applied along the vertical direction. This arrangement can be doubled up and placed close to each of the two lateral fittings, so that the Fail Safe function can be applied to each of them.

The two so-called Fail Safe functions associated with the two lateral fittings can be further improved by arranging the aft engine attachment to also comprise an ancillary pin associated with each of the two arrangements passing through the second box spar and having one end housed in the aft attachment body, this end being provided with a reaming through which the pin also passes. The pin is preferably oriented along the longitudinal direction of the pylon.

Finally, another purpose of the invention is an aircraft comprising at least one attachment pylon like that described above.

Other advantages and characteristics of the invention will appear in the non-restrictive detailed description below.

BRIEF DESCRIPTION OF THE DRAWINGS

This description will be made with reference to the attached illustrations, among which.

the figure shows a view diagrammatically showing each of the engine attachments of the assembly resisting forces as shown in FIG. 1.

DETAILED DESCRIPTION OF PREFERRED EMBODIMENTS

Figure 1:
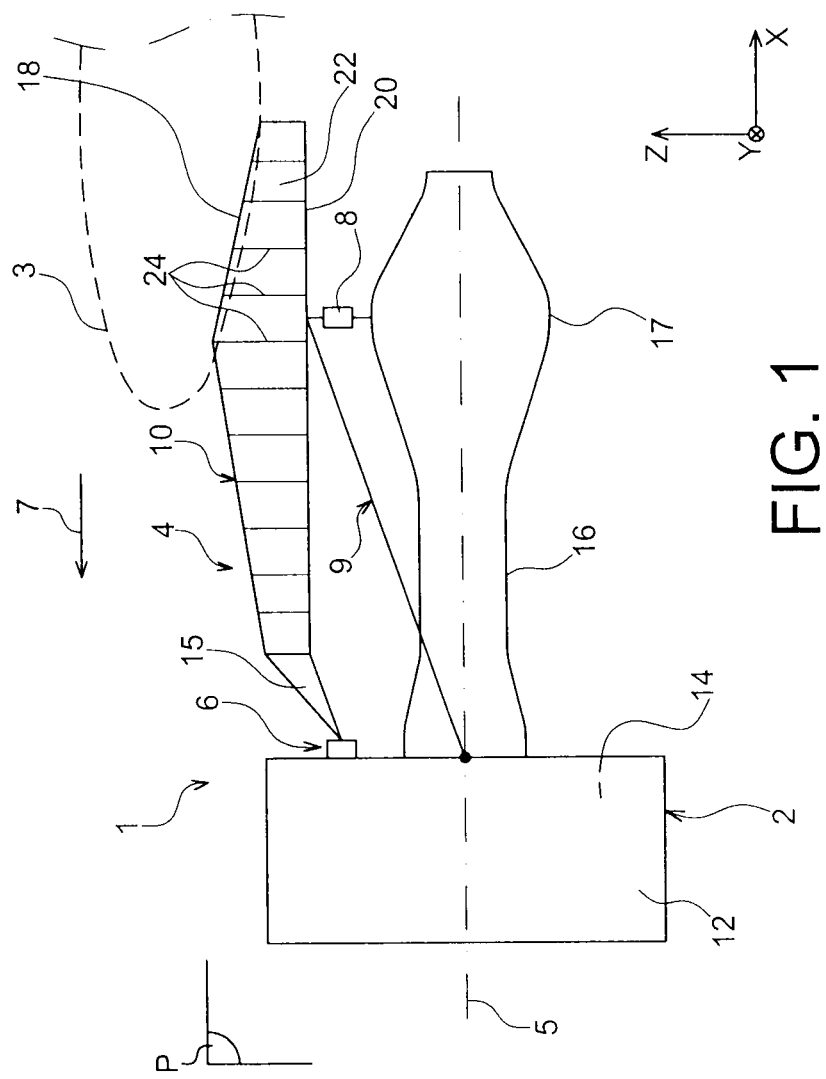
FIG. 1 shows a partial schematic side view of an aircraft engine assembly, comprising an attachment pylon according to a preferred embodiment of this present invention.

FIG. 1 shows an engine assembly 1 for an aircraft that will be fixed under a wing 3 of this aircraft (not shown), this assembly 1 comprising an attachment pylon 4 according to a preferred embodiment of this invention.

Globally, the engine assembly 1 is composed of an engine such as a turbojet 2 and the attachment pylon 4, this pylon in particular being provided with a plurality of engine attachments 6, 8, 9 and a rigid structure 10 called the primary structure supporting these attachments. For information, it should be noted that the assembly 1 is designed to be surrounded by a pod (not shown) and that the attachment pylon 4 is provided with another series of attachments (not shown) used to suspend this assembly 1 under the aircraft wing.

Throughout the following description, by convention, X refers to the longitudinal direction of the pylon 4 that is also considered to be the same as the longitudinal direction of the turbojet 2, this X direction being parallel to a longitudinal axis 5 of this turbojet 2. Furthermore, the direction transverse to the pylon 4 is called the Y direction and can also be considered to be the same as the transverse direction of the turbojet 2, and Z is the vertical direction or the height, these three X, Y and Z directions being orthogonal to each other.

In addition, the terms "forward" and "aft" must be considered relative to the forward direction of the aircraft imparted due to the thrust exerted by the turbojet 2, this direction being represented schematically by the arrow 7.

FIG. 1 shows that only the engine attachments 6, 8, 9 and the rigid structure 10 of the attachment pylon 4 are shown. The other elements forming this pylon 4 that are not shown such as the attachment means of the rigid structure 10 under the aircraft wing, or the secondary structure for segregation of systems and holding them in place and supporting aerodynamic fairings, are classical elements or similar to those found in prior art and known to those skilled in the art. Consequently, no detailed description of them will be made.

The rigid structure 10 is in the classical form of a box formed by an upper spar 18 called the first spar, and a lower spar 20 called the second spar, both extending along the X direction and approximately in an XY plane or a plane slightly inclined relative to the XY plane, and two lateral panels 22 (only one being shown in FIG. 1), both extending along the X direction and approximately in an XZ plane. Transverse ribs 24 inside this box located in YZ planes and at a longitudinal spacing reinforce the stiffness of the rigid structure 10. Note for information that each of the elements 18, 20, 22 can be made from a single piece, or by the assembly of contiguous sections.

Furthermore, the turbojet 2 is provided with a large dimension fan casing 12 at the forward end delimiting an annular fan duct 14 and comprises a smaller central casing 16 towards the aft and containing the core of this turbojet. Finally, the central casing 16 is prolonged towards the aft direction by an exhaust casing 17 larger than the casing 16. Obviously, the casings 12, 16 and 17 are fixed to each other.

As can be seen in FIG. 1, the plurality of engine attachments is composed of a forward engine attachment 6, an aft engine attachment 8 actually forming two aft half-attachments, and an attachment 9 forming a device for resistance of thrusts generated by the turbo engine 2. As shown diagrammatically in FIG. 1, this device 9 is for example in the form of two lateral connecting rods (only one being visible due to the side view) connected firstly to an aft part of the fan casing 12, and secondly to a spreader beam mounted on the aft attachment 8. Note also that the aft ends of these connection rods could alternately be connected to a spreader beam further forward than the aft attachment.

The forward engine attachment 6, fixed to the pyramid 15 of the rigid structure 10 and to the fan casing 12, is conventionally designed so that it can resist only forces generated by the turbojet 2 along the Y and Z directions, and therefore not forces applied along the X direction. For guidance, this forward attachment 6 preferably penetrates into an internal portion of the fan casing that supports the fixed blades of the fan casing, near a forward end of the central casing.

The aft engine attachment 8 forms one particular feature of the invention and will be described in more detail with reference to FIGS. 2 to 4. It is inserted globally between the exhaust casing 17 and the rigid structure 10 of the pylon. It is designed to form two half-attachments arranged symmetrically about a plane P defined by the axis 5 and the Z direction, each of these half-attachments being designed to resist forces generated by the turbojet 2 along the Y and Z directions, but not forces applied along the X direction.

Figure 1A:
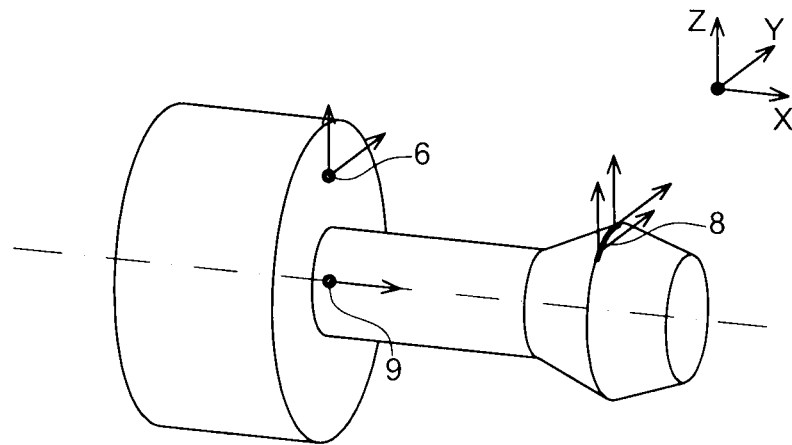

In this way, as can be seen diagrammatically in FIG. 1a, forces are resisted along the X direction by means of the attachment 9, and forces applied along the Y and Z directions are resisted jointly by means of the forward attachment 6 and the aft attachment 8.

Furthermore, the moment applied about the X direction is resisted vertically by means of the two half-attachments of the attachment 8, the moment applied about the Y direction is resisted vertically by means of the two half-attachments of the attachment 8 in cooperation with the attachment 6, and the moment applied about the Z direction is resisted transversely by the attachment 8 in cooperation with the attachment 6.

Figure 2:
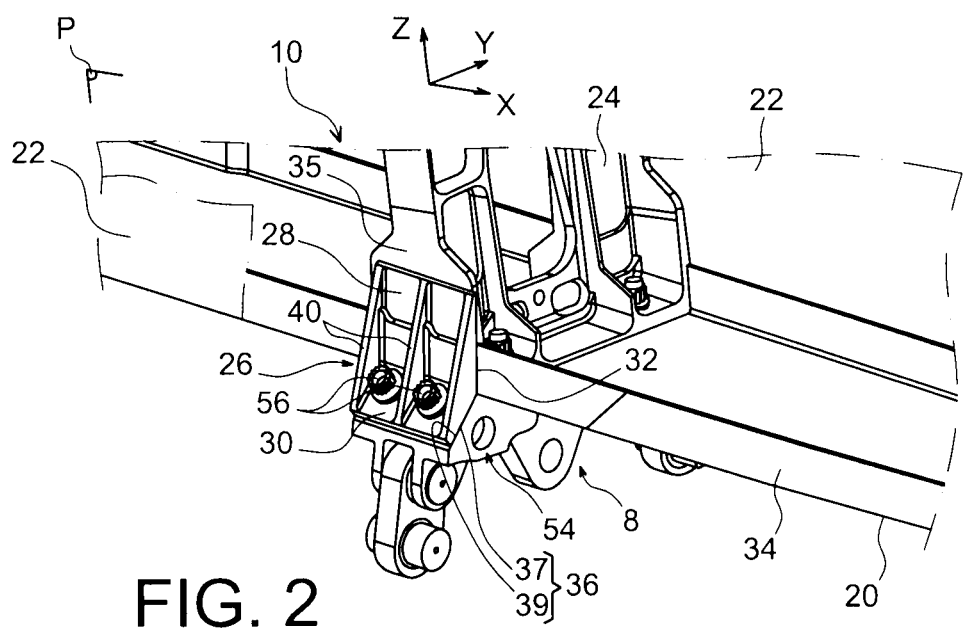
FIG. 2 shows a perspective view of part of the aft engine attachment of the pylon shown in FIG. 1.

FIG. 2 shows part of the aft engine attachment 8, forming the two aft half-attachments, each of which resists forces applied along the Y and Z directions, and being arranged symmetrically relative to the above-mentioned plane P.

Since the two aft half-attachments are symmetric, only the left half-attachment visible in FIG. 2 will be described below. Globally, it comprises a lateral fitting 26 comprising a first attachment plate 28 on the box, and a second attachment plate 30 on an aft attachment body 54. Preferably, it has a plane of symmetry oriented along the Y and Z directions. Therefore the first plate 28 extends along the X direction approximately in an XZ plane, and it comprises an inner face 32 in plane contact with an outer surface of the associated lateral panel 22. Therefore, this first attachment plate 28 is preferably in contact only with this panel 22 of the box, itself in plane contact with a lateral flange 34 of the lower spar 20 and the rib 24 facing it, as will be described below. For information, those skilled in the art will know that this flange 34 is approximately in an XZ plane so that the lateral panel 22 can be assembled to this spar 20, for example by riveting or clipping.

The plate 28 is preferably assembled to the panel 22 using through bolts (not shown) passing through the plate 28, the lateral panel 22, the edge 35 and possibly the flange 34 for the lowest bolts, in sequence.

The second attachment plate 30 has an attachment face or bearing surface 37 in plane contact with a complementary attachment face or bearing surface 39 provided at the lateral end of the attachment body 54, these two faces 37, 39 forming a plane attachment interface 36 specific to this invention, which will be described more fully with reference to FIG. 4.

Furthermore, the lateral fitting 26 comprises stiffener ribs 40 fixed to the upper face of the attachment plate 30 and the outer face of the attachment plate 28, these ribs 40 being oriented along parallel YZ planes. Preferably, it could be arranged that the interface 36 is located approximately in lateral continuity with a lower surface of the spar 20, as can be seen in FIG. 2.

Figure 3:
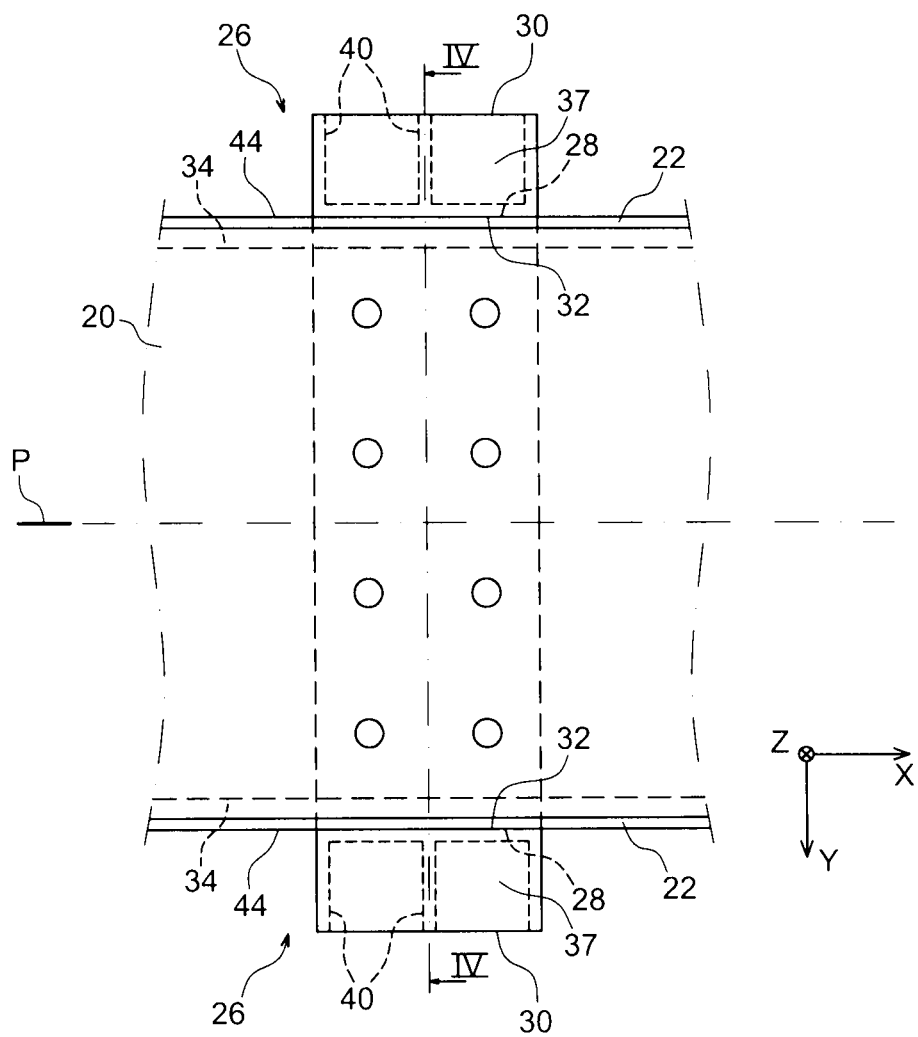
FIG. 3 shows a bottom view of the pylon shown in FIG. 2, with the aft engine attachment body having been removed.
Figure 4:
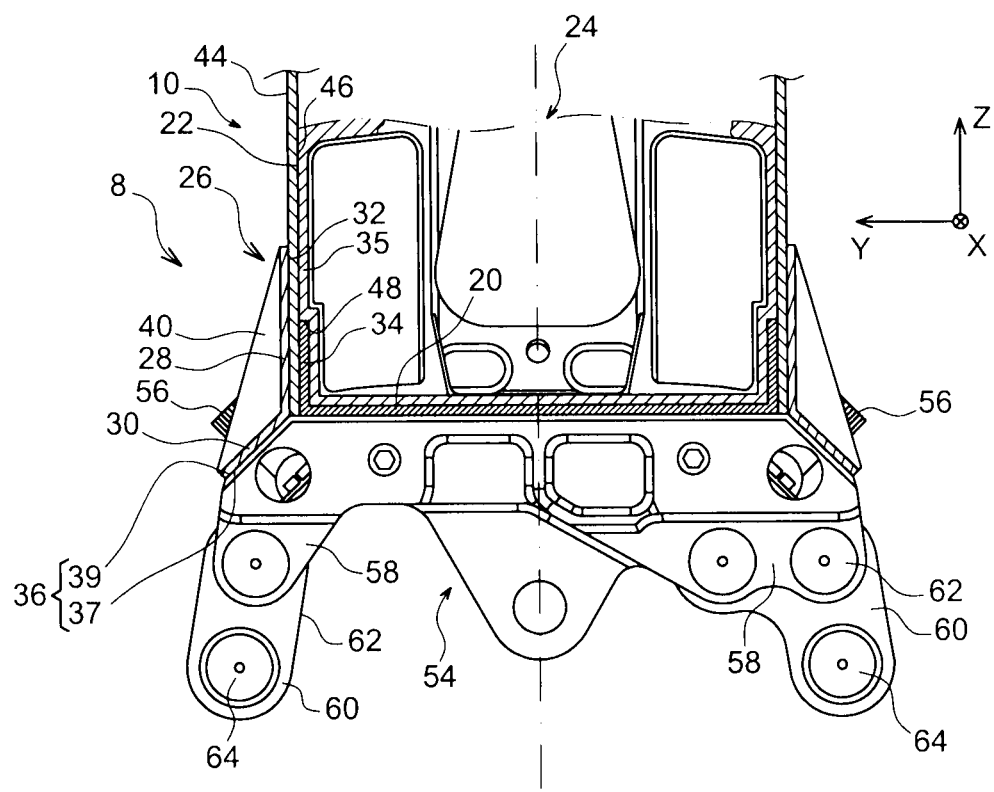
FIG. 4 shows a cross-sectional view taken along line IV-IV in FIG. 3.

Now with reference more specifically to FIGS. 3 and 4, the figures show that the inner face 32 of the plate 28 is in contact with an outer face 44 of the lateral panel 22 associated with it. Consequently, the entire lateral fitting 26 is outside with the box, the only contact with the box being provided between surfaces 32 and 44.

Furthermore, the inner surface 46 of the part of the panel with which the plate 28 is in contact is itself in plane contact with a plane surface defined jointly through the vertical edge 35 of the inner rib 24, and in the lower part through a lateral flange 34 of the spar 20. To achieve this, a slight offset 48 is provided at the lower part of the edge 35, to house the flange 34 with corresponding thickness.

As can be seen in FIG. 3, the panel 22 does not require any recess to enable the passage of the lateral fittings 26, and the lower spar 20 is approximately constant width, namely it does not have a transverse choke.

Now with reference more specifically to FIG. 4, each lateral fitting 26 that is preferably made from a single piece of titanium, is therefore fixed to the aft attachment body 54 arranged transversely below the lower spar 20. A small clearance may be provided between the body 54 and the lower spar 20 facing it.

The body 54 then comprises a clevis 58 for each half-attachment, on which a shackle 60 is articulated by a pin 62 along the X direction. As can be seen in FIG. 4, the shackle or connecting rod 60 is slightly inclined from the vertical, so that the distance from the plane P reduces as the height increases.

For information, a second pin 64 also oriented along the X direction is also provided at the lower end of the shackle 60, so that the shackle can be articulated onto a fitting/clevis (not shown) fixed to the casing of the turbojet 2. Consequently, it will be understood that each aft half-attachment comprises the articulated shackle 60, the clevis 58 and the fitting 26, the two clevises 58 of the two half-attachments also being connected within the same aft attachment body 54, preferably made of a single piece.

One of the special features of this invention lies in the fact that a section through each interface 36 in any YZ transverse plane of the pylon passing through the attachment interfaces 36, like the section shown in FIG. 4, is in the form of a straight line segment inclined at 45° from the Z direction. Knowing that each interface is preferably parallel to the X direction, the straight segment is identical regardless of the plane of the section. This limits the size along the Y direction, and by means of each aft half-attachment, resists forces applied along the Y direction and along the Z direction. The inclination is such that the lateral distance between each attachment interface 36 and the box increases with increasing distance along the Z direction from the spar 18 towards the spar 20. Consequently, the two straight segments symmetric about plane P belong to two fictitious straight lines intercepting in the box 10.

The bolts 56 that pass through these interfaces are preferably all oriented to be orthogonal to their associated interface 36, and are therefore also oriented at 45° relative to the vertical direction. They maintain the pressure between the bearing surfaces 37 and 39, with a screw head arranged laterally outside the box and a nut housed in the engine attachment body 54.

Therefore, in the example shown in the figures, the first and second attachment plate 28, 30 are both parallel to the X direction and are inclined at an angle of about 225° relative to each other.

The above description shows that the aft engine attachment 8 forms two half-attachments, each capable of resisting forces applied along the Y direction and along the Z direction. Pins 80 (visible in FIG. 2) and pins (not shown) similar to those described in document EP 1 896 327 B1 may nevertheless be provided to perform the so-called Fail Safe function to resist forces along these two Y and Z directions.

Obviously, those skilled in the art can make various modifications to the attachment pylon 4 of the turbojet 2 for an aircraft that has just been described, solely as a non-limitative example. In this respect, it is worth mentioning that although the pylon 4 has been presented in an adapted configuration for it to be suspended under the aircraft wing, this pylon 4 could also be presented in a different configuration so that it could be mounted above this wing.

The invention claimed is:

1. An attachment pylon for an aircraft engine, the pylon comprising:
   a box type rigid structure including an assembly of a first spar, a second spar at a spacing from the first spar along a vertical direction of the pylon, two lateral panels, and transverse inner ribs connecting the spars and panels,
   an aft engine attachment fitted with an aft attachment body arranged outside the box, facing the second spar, the aft engine attachment including two lateral fittings associated with a corresponding panel of the two lateral panels, the two lateral fittings each including a bearing surface projecting laterally outside the box to abut a corresponding face of attachment faces of the aft attachment body,
   wherein each of the bearing surfaces and each of the attachment faces include a straight segment inclined at 45.degree. from the vertical direction of the pylon with respect to a transverse direction of the pylon, the bearing surface extending away from the box in a direction from the first spar towards the second spar.

2. The attachment pylon according to claim 1, wherein each lateral fitting of the aft engine attachment comprises a first attachment plate attached onto the box, and a second attachment plate attached onto the attachment body, the second attachment plate having the bearing surface defining an attachment interface.

3. The attachment pylon according to claim 2, wherein the first attachment plate and the second attachment plate are connected by stiffener ribs, the stiffener ribs each extend parallel to a transverse plane of the pylon defined by the vertical direction and the transverse direction.

4. The attachment pylon according to claim 2 or claim 3, wherein the first attachment plate bears exclusively on an outer surface of the corresponding lateral panel.

5. The attachment pylon according to claim 4, wherein the lateral panel, on which the first attachment plate bears, has an inner surface that sandwiches a portion of the second spar with an offset portion of the transverse inner ribs.

6. The attachment pylon according to claim 3, wherein each of the stiffener ribs is perpendicular to both the first attachment plate and the second attachment plate.

7. The attachment pylon according to claim 6, wherein each bearing surface is secured to the corresponding face of the attachment faces via two bolts orthogonal to the corresponding face, and
   wherein one stiffener rib of the stiffener ribs is disposed between the two bolts.

8. The attachment pylon according to claim 3, wherein each of the two lateral fittings includes three stiffener ribs.

9. The attachment pylon according to claim 1, wherein the second spar has an approximately constant width.

10. The attachment pylon according to claim 1, wherein each of the two lateral fittings of the aft engine attachment is made in a single piece.

11. The attachment pylon according to claim 1, wherein each of the two lateral fittings of the aft engine attachment is made from titanium.

12. The attachment pylon according to claim 1, wherein the aft engine attachment is designed so as to define two half-attachments each capable of resisting forces applied along the vertical direction and along the transverse direction of the pylon, and
   wherein the two half-attachments are disposed separately from each other on opposite sides of the box.

13. An aircraft comprising at least one attachment pylon according to claim 1.

14. The attachment pylon according to claim 1, wherein each bearing surface is secured to the corresponding face of the attachment faces via at least one bolt orthogonal to the corresponding face.

15. The attachment pylon according to claim 1, wherein the two lateral fittings resist all forces applied in the vertical direction via the aft attachment body.

* * * * *